(12) United States Patent
Davis et al.

(10) Patent No.: US 7,945,590 B2
(45) Date of Patent: May 17, 2011

(54) PROGRAMMABILITY FOR BINDING DATA

(75) Inventors: Tristan A. Davis, Redmond, WA (US);
Brian M. Jones, Redmond, WA (US);
Ali Taleghani, Redmond, WA (US);
Robert A. Little, Redmond, WA (US);
Marcin Sawicki, Kirkland, WA (US);
Mark Sunderland, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 306 days.

(21) Appl. No.: 11/066,083

(22) Filed: Feb. 25, 2005

(65) Prior Publication Data
US 2006/0195783 A1   Aug. 31, 2006

Related U.S. Application Data

(63) Continuation-in-part of application No. 11/030,423, filed on Jan. 6, 2005, now Pat. No. 7,730,394.

(51) Int. Cl.
*G06F 7/00* (2006.01)
*G06F 17/30* (2006.01)

(52) U.S. Cl. ........ 707/796; 707/794; 707/795; 707/803; 715/209; 715/234; 715/255

(58) Field of Classification Search ................ 715/501.1, 715/513
See application file for complete search history.

(56) References Cited

U.S. PATENT DOCUMENTS

| | | | |
|---|---|---|---|
| 5,287,504 A | 2/1994 | Carpenter et al. | 707/201 |
| 5,440,745 A | 8/1995 | Platte et al. | 718/101 |
| 5,630,131 A | 5/1997 | Palevich et al. | 717/108 |
| 5,715,415 A | 2/1998 | Dazey et al. | 715/708 |
| 5,717,741 A | 2/1998 | Yue et al. | 379/88.12 |
| 5,787,449 A * | 7/1998 | Vulpe et al. | 715/203 |
| 5,845,299 A | 12/1998 | Arora et al. | 715/209 |
| 5,903,902 A | 5/1999 | Orr et al. | 715/202 |
| 5,910,075 A * | 6/1999 | Arnell et al. | 49/25 |
| 5,911,068 A * | 6/1999 | Zimmerman et al. | 719/328 |
| 5,974,430 A * | 10/1999 | Mutschler et al. | 715/505 |
| 5,991,878 A | 11/1999 | McDonough et al. | 726/9 |
| 6,006,239 A | 12/1999 | Bhansali et al. | 707/201 |

(Continued)

FOREIGN PATENT DOCUMENTS

JP   11-306178   11/1999

(Continued)

OTHER PUBLICATIONS

Comai et al., "Computing graphical queries over XML data", ACM Transactions on Information Systems TOIS, Oct. 2001, ACM Press, vol. 19 Issue 4, p. 371-430.*

(Continued)

*Primary Examiner* — Shew-Fen Lin
(74) *Attorney, Agent, or Firm* — Merchant & Gould

(57) ABSTRACT

An object model allows code to be developed using a programming environment to access the functionality of an application, in a word processing application, for example. The object model may be used to manipulate one or more data bindings in an application. Code may also be developed using a programming environment for reacting to changes, in either direction, of a content region or a node in XML data associated with one or more data bindings. Code may be developed to define data bindings between file content and content within data in a data store. Additionally, code may be developed that reacts to changes within a bound region of a file or within a data store, trapping or intercepting events, such as edits, additions, deletions, etc.

20 Claims, 4 Drawing Sheets

U.S. PATENT DOCUMENTS

| | | | |
|---|---|---|---|
| 6,014,677 A | 1/2000 | Hayashi et al. | 707/104.1 |
| 6,088,431 A | 7/2000 | LaDue | 379/114.2 |
| 6,157,940 A | 12/2000 | Marullo et al. | 703/27 |
| 6,247,020 B1 | 6/2001 | Minard | 707/104.1 |
| 6,258,851 B1 | 7/2001 | Floyd et al. | 715/744 |
| 6,275,824 B1 | 8/2001 | O'Flaherty et al. | 707/9 |
| 6,317,777 B1 | 11/2001 | Skarbo et al. | 709/294 |
| 6,397,351 B1 | 5/2002 | Miller et al. | 714/13 |
| 6,457,002 B1 | 9/2002 | Beattie et al. | 707/3 |
| 6,490,601 B1 | 12/2002 | Markus et al. | 715/507 |
| 6,507,856 B1 | 1/2003 | Chen et al. | 715/205 |
| 6,562,076 B2 | 5/2003 | Edwards et al. | 715/229 |
| 6,571,253 B1* | 5/2003 | Thompson et al. | 707/103 R |
| 6,629,843 B1 | 10/2003 | Bunting et al. | 434/118 |
| 6,731,314 B1 | 5/2004 | Cheng et al. | 715/848 |
| 6,859,821 B1 | 2/2005 | Ozzie et al. | 709/205 |
| 6,865,599 B2 | 3/2005 | Zhang | 709/218 |
| 6,915,482 B2 | 7/2005 | Jellum et al. | 715/234 |
| 6,920,455 B1 | 7/2005 | Weschler | 707/100 |
| 6,944,622 B1 | 9/2005 | Mitchell et al. | 707/102 |
| 6,944,662 B2 | 9/2005 | Devine et al. | 709/225 |
| 6,950,990 B2 | 9/2005 | Rajarajan et al. | 715/736 |
| 6,996,769 B1 | 2/2006 | Peikes et al. | 715/512 |
| 7,017,112 B2 | 3/2006 | Collie et al. | 715/513 |
| 7,035,839 B1 | 4/2006 | Gillespie et al. | 707/2 |
| 7,039,708 B1 | 5/2006 | Knobl et al. | 709/227 |
| 7,039,863 B1* | 5/2006 | Caro et al. | 715/530 |
| 7,085,773 B2 | 8/2006 | Dorsett, Jr. | 707/104.1 |
| 7,111,284 B2 | 9/2006 | Takagi et al. | 707/E17.006 |
| 7,117,504 B2* | 10/2006 | Smith et al. | 719/328 |
| 7,200,816 B2* | 4/2007 | Falk et al. | 715/762 |
| 7,237,002 B1 | 6/2007 | Estrada et al. | 709/203 |
| 7,340,481 B1 | 3/2008 | Baer et al. | 707/104.1 |
| 7,386,563 B1 | 6/2008 | Pal | 707/102 |
| 7,509,305 B2 | 3/2009 | Tozawa et al. | 707/3 |
| 7,562,342 B2* | 7/2009 | Berg et al. | 717/108 |
| 7,657,832 B1 | 2/2010 | Lin | 715/234 |
| 2001/0056463 A1 | 12/2001 | Grady et al. | 709/203 |
| 2002/0010716 A1* | 1/2002 | McCartney et al. | 707/517 |
| 2002/0013792 A1 | 1/2002 | Imielinski et al. | 707/513 |
| 2002/0065110 A1 | 5/2002 | Enns et al. | 455/566 |
| 2002/0085020 A1 | 7/2002 | Carroll, Jr. | 345/700 |
| 2002/0107867 A1 | 8/2002 | Takagi et al. | 707/102 |
| 2002/0133516 A1 | 9/2002 | Davis et al. | 707/513 |
| 2002/0161801 A1* | 10/2002 | Hind et al. | 707/513 |
| 2002/0198962 A1 | 12/2002 | Horn et al. | 709/218 |
| 2003/0007009 A1* | 1/2003 | Haley | 345/805 |
| 2003/0018666 A1* | 1/2003 | Chen et al. | 707/513 |
| 2003/0018714 A1 | 1/2003 | Mikhailov et al. | 709/203 |
| 2003/0023632 A1* | 1/2003 | Ries et al. | 707/513 |
| 2003/0023953 A1 | 1/2003 | Lucassen et al. | 717/106 |
| 2003/0051054 A1 | 3/2003 | Redlich et al. | 709/246 |
| 2003/0097457 A1 | 5/2003 | Saran et al. | 709/230 |
| 2003/0159111 A1* | 8/2003 | Fry | 715/513 |
| 2003/0163603 A1* | 8/2003 | Fry et al. | 709/328 |
| 2003/0164859 A1 | 9/2003 | Evans | 345/792 |
| 2003/0174162 A1 | 9/2003 | Wu | 345/736 |
| 2004/0021679 A1* | 2/2004 | Chapman et al. | 345/700 |
| 2004/0073565 A1 | 4/2004 | Kaufman et al. | 707/101 |
| 2004/0088332 A1 | 5/2004 | Lee et al. | 707/200 |
| 2004/0088647 A1 | 5/2004 | Miller et al. | 715/500 |
| 2004/0098667 A1* | 5/2004 | Atkinson | 715/513 |
| 2004/0103147 A1 | 5/2004 | Flesher et al. | 709/204 |
| 2004/0111672 A1 | 6/2004 | Bowman et al. | 715/513 |
| 2004/0153467 A1 | 8/2004 | Conover et al. | 707/100 |
| 2004/0183830 A1 | 9/2004 | Cody et al. | 715/747 |
| 2004/0199876 A1 | 10/2004 | Ethier et al. | 715/213 |
| 2004/0205565 A1* | 10/2004 | Gupta | 715/513 |
| 2004/0205653 A1 | 10/2004 | Hadfield et al. | 715/530 |
| 2004/0217985 A9 | 11/2004 | Ries et al. | 715/740 |
| 2004/0220926 A1 | 11/2004 | Lamkin et al. | 707/3 |
| 2004/0225958 A1 | 11/2004 | Halpert et al. | 715/513 |
| 2004/0237036 A1 | 11/2004 | Quist et al. | 715/513 |
| 2004/0243938 A1* | 12/2004 | Weise et al. | 715/526 |
| 2004/0268240 A1 | 12/2004 | Vincent | 715/513 |
| 2005/0014494 A1* | 1/2005 | Owen et al. | 455/419 |
| 2005/0027618 A1 | 2/2005 | Zucker et al. | 705/26 |
| 2005/0033667 A1 | 2/2005 | Sugimoto et al. | 705/28 |
| 2005/0033766 A1 | 2/2005 | Pang et al. | 707/104.1 |
| 2005/0034079 A1 | 2/2005 | Gunasekar et al. | 715/753 |
| 2005/0044145 A1 | 2/2005 | Quinn et al. | 709/205 |
| 2005/0050066 A1 | 3/2005 | Hughes | 707/100 |
| 2005/0068913 A1 | 3/2005 | Tan et al. | 370/310 |
| 2005/0071477 A1 | 3/2005 | Evans et al. | 709/228 |
| 2005/0076295 A1 | 4/2005 | Simske et al. | 715/517 |
| 2005/0086384 A1* | 4/2005 | Ernst | 709/248 |
| 2005/0091346 A1 | 4/2005 | Krishnaswami et al. | 709/220 |
| 2005/0091576 A1* | 4/2005 | Relyea et al. | 715/502 |
| 2005/0114771 A1 | 5/2005 | Piehler et al. | 715/536 |
| 2005/0154978 A1* | 7/2005 | Albornoz et al. | 715/513 |
| 2005/0183001 A1* | 8/2005 | Carter et al. | 715/501.1 |
| 2005/0187973 A1 | 8/2005 | Brychell et al. | 707/104.1 |
| 2005/0188349 A1* | 8/2005 | Bent et al. | 717/106 |
| 2005/0188350 A1* | 8/2005 | Bent et al. | 717/106 |
| 2005/0289457 A1* | 12/2005 | Obasanjo et al. | 715/513 |
| 2006/0031755 A1 | 2/2006 | Kashi | 715/512 |
| 2006/0036692 A1 | 2/2006 | Morinigo et al. | 709/206 |
| 2006/0041558 A1 | 2/2006 | McCauley et al. | 707/10 |
| 2006/0048112 A1 | 3/2006 | Thiagarajan et al. | 717/144 |
| 2006/0053158 A1 | 3/2006 | Hall et al. | 707/102 |
| 2006/0053194 A1 | 3/2006 | Schneider et al. | 709/204 |
| 2006/0069987 A1 | 3/2006 | Jones et al. | 715/520 |
| 2006/0069989 A1 | 3/2006 | Jones et al. | 715/526 |
| 2006/0080590 A1 | 4/2006 | Jones et al. | 715/500 |
| 2006/0136441 A1 | 6/2006 | Fujisaki | 707/101 |
| 2006/0150085 A1* | 7/2006 | Davis et al. | 715/513 |
| 2006/0195413 A1 | 8/2006 | Davis et al. | 707/1 |
| 2006/0195454 A1* | 8/2006 | Davis et al. | 707/100 |
| 2006/0195777 A1 | 8/2006 | Davis et al. | 715/500 |
| 2006/0282452 A1 | 12/2006 | Takagi et al. | 707/101 |
| 2007/0061382 A1 | 3/2007 | Davis et al. | 707/201 |
| 2007/0118554 A1 | 5/2007 | Chang et al. | 707/102 |

FOREIGN PATENT DOCUMENTS

| | | |
|---|---|---|
| JP | 2000-227914 | 8/2000 |
| JP | 2001-052087 | 2/2001 |
| JP | 2001-0125895 | 5/2001 |
| JP | 2002-118734 | 4/2002 |
| JP | 2002-229723 | 8/2002 |
| JP | 2004-054842 | 2/2004 |
| KR | 2004-0020933 A | 3/2004 |
| KR | 2004-0034327 A | 4/2004 |
| RU | 2004136278 A | 8/2005 |
| WO | WO 01/08033 A2 | 2/2001 |
| WO | WO 01/08033 A3 | 2/2001 |
| WO | WO 01/11486 A2 | 2/2001 |
| WO | WO 01/11486 A3 | 2/2001 |
| WO | WO 01/15004 A2 | 3/2001 |
| WO | WO 01/95155 A2 | 12/2001 |
| WO | WO 01/95155 A3 | 12/2001 |

OTHER PUBLICATIONS

Altova, "xmlspy5: User & Reference Manual", Jan. 3, 2003, www.altova.com, p. 13-30, 698-701, 890.*

Official Action in U.S. Appl. No. 11/066,058 dated Oct. 1, 2008.

Sara Comai et al., "Computing Graphical Queries Over XML Data," ACM Transactions on Information Systems TOIS, ACM Press, vol. 19, No. 4, Oct. 2001, pp. 371-430.

U.S. Appl. No. 11/065,754, filed Feb. 25, 2005, entitled: "Method and Apparatus for Utilizing an Object Model for Managing Content Regions in an Electronic Document".

Souchon et al.; "A Review of XML-compliant User-interface Description Languages"; LNCS, copyright Springer-Verlag 2003, p. 377-391.

Meyer, "aTool-Creating Validated XML Documents on the Fly Using MS Word"; SIGDOC, copyright Oct. 2002, ACM, p. 113-121.

Memorandum and four figures regarding StarOffice 5.1; date is unknown, but believed to be earlier than Jan. 5, 2001, 5 pp.

Habraken, Jr., StarOffice 5.2 Calc Handbook, Prentice Hall, Dec. 2000, Chapter 2, 5 pp.

Leslie, "Using Javadoc and XML to Produce API reference Documentation", SIGDOC '02, Oct. 23, 2002, AMC Press, p. 104-109.

Sun et al., "Operational Transformation for Collaborative Word Processing", Proceedings of the Conference of CSCW'04, Nov. 10, 2004, ACM Press, p. 437-446.

McKenzie et al., "XFA Template Version 1.0", http://www.w3.org/1999/05/XFA/xfa-template, retrieved on May 30, 2008, 60 pp.
Heslop et al., "Word 2003 Bible", Wiley Publishing, 2003, pp. 441-443.
Altova, "xmlspy5: User & Reference Manual," Jan. 3, 2003, www.altova.com, pp. 13-30, 698-701, 890.
U.S. Appl. No. 11/030,423, filed Jan. 6, 2005, entitled "Data Binding in a Word-Processing Application".
U.S. Appl. No. 11/066,058, filed Feb. 25, 2005, entitled "Method and Apparatus of Utilizing an Extensible Markup Language Schema for Managing Specific Types of Content in an Electronic Document".
U.S. Appl. No. 11/067,383, filed Feb. 25, 2005, entitled "XML Schema for Binding Data".
U.S. Appl. No. 11/066,117, filed Feb. 25, 2005, entitled "Data Store for Software Application Documents".
Official Action in U.S. Appl. No. 10/955,612 dated Sep. 19, 2006.
Official Action in U.S. Appl. No. 11/030,423 dated Nov. 22, 2006.
Official Action in U.S. Appl. No. 11/030,423 dated May 15, 2007.
Official Action in U.S. Appl. No. 11/066,117 dated Jun. 21, 2007.
Official Action in U.S. Appl. No. 11/067,383 dated Jun. 28, 2007.
Official Action in U.S. Appl. No. 11/030,423 dated Oct. 4, 2007.
Official Action in U.S. Appl. No. 11/066,117 dated Feb. 15, 2008.
Official Action in U.S. Appl. No. 10/955,612 dated Mar. 10, 2008.
Official Action in U.S. Appl. No. 11/030,423 dated Jul. 10, 2008.
Official Action in U.S. Appl. No. 11/065,754 dated Jun. 13, 2008.
European Search Report dated Dec. 19, 2007 in EP 05112126.7.
European Search Report dated Dec. 19, 2007 in EP 05112131.7.
European Examination Report dated Mar. 3, 2008 in EP 05112126.7.
European Examination Report dated Mar. 3, 2008 in EP 05112131.7.
European Search Report dated Jun. 12, 2008 in EP 05105427.8.
Chinese First Office Action dated May 9, 2008 cited in Chinese Application No. 200510088514.8.
Official Action in U.S. Appl. No. 10/955,612 dated Jun. 25, 2009.
Chinese Third Office Action dated Jun. 5, 2009 in 200510088514.8.
Ladd et al., "Using HTLM, 4, XML and Java 1.2", Que, Platinum Edition, Dec. 1998, pp. 693-701.
Narravula et al., "Supporting Strong Coherency for Active Caches in Multi-Tier Data-Centers over InfiniBand", ANL.gov, 2004, pp. 1-10 (retrieved from CiteseerX May 5, 2009).
Narravula et al., "Designing Efficient Cooperative Caching Schemes for Multi-Tier Data-Centers over RDMA-enabled Networks", OCU-CISRC-6/05-TR39, Jun. 2005, pp. cover page, 1-10 (retrieved from Internet May 5, 2009).
Official Action in U.S. Appl. No. 10/955,612 dated May 18, 2007.
Official Action in U.S. Appl. No. 11/331,586 dated Jul. 26, 2007.
Official Action in U.S. Appl. No. 11/332,468 dated Dec. 17, 2007.
Official Action in U.S. Appl. No. 11/331,586 dated Dec. 27, 2007.
Official Action in U.S. Appl. No. 11/332,468 dated Jul. 18, 2008.
Official Action in U.S. Appl. No. 11/331,586 dated Sep. 29, 2008.
Official Action in U.S. Appl. No. 10/955,612 dated Dec. 3, 2008.
Office Action in U.S. Appl. No. 11/065,754 dated Jan. 22, 2009.
Official Action in U.S. Appl. No. 11/030,423 dated Feb. 18, 2009.
Official Action in U.S. Appl. No. 11/332,468 dated Mar. 11, 2009.
Official Action in U.S. Appl. No. 11/066,177 dated Apr. 8, 2009.
Office Action in U.S. Appl. No. 11/066,058 dated Apr. 13, 2009.
Office Action in U.S. Appl. No. 11/331,586 dated May 12, 2009.
PCT Search Report dated Jan. 16, 2007 in PCT/US2006/034802.
PCT Search Report dated Mar. 12, 2007 in PCT/US2006/034974.
European Search Report dated Mar. 31, 2006 in EP 06100594.8.
European Communication dated May 13, 2009 in EP 05105427.8.
Chinese First Office Action dated Jul. 4, 2008 in 200510128896.2.
Chinese Second Office Action dated Nov. 21, 2008 in 200510088514.8.
Chinese First Office Action dated Nov. 7, 2008 in 200610007194.3.
Sun_Micro, How to Write Doc Comments for the Javadoc Tool, Sep. 2004, pp. 1-16.
Sala, et al., ML 3.0 Smoothed Aggregation User's Guide, Computational Math and Algorithms, Sandia Notational Laboratories, May 2004, pp. 3-66.
Official Action in U.S. Appl. No. 11/066,117 dated Oct. 14, 2008.
Chinese First Office Action dated Aug. 29, 2008 in 200510128895.8.
Mascolo et al., "XMiddle a Data-Sharing Middleware for Mobile Computing", Wireless Personal Communications, Springer, Dordrecht, NL, vol. 21, No. 1, Apr. 1, 2002, pp. 77-103.
Bodart et al., "Architecture Elements for Highly-Interactive Business-Oriented Applications", Lecture Notes in Computer Science, Springer Berlin/Heidelberg, vol. 753/1993, copyright 1993, pp. 83-104.
Official Action in U.S. Appl. No. 11/065,754 dated Jul. 8, 2009.
Official Action in U.S. Appl. No. 11/066,058 mailed Sep. 24, 2009.
Official Action in U.S. Appl. No. 11/030,423 dated Sep. 25, 2009.
Official Action in U.S. Appl. No. 11/332,468 dated Oct. 20, 2009.
Official Action in U.S. Appl. No. 10/955,612 dated Nov. 12, 2009.
Official Action in U.S. Appl. No. 11/331,586 dated Nov. 13, 2009.
European Search Report dated Oct. 6, 2009 in EP 06824911.9-1225.
Chinese First Office Action dated Jul. 24, 2009 in 200680033069.8.
Chinese First Office Action dated Aug. 28, 2009 in 200680033162.9.
Chinese Second Office Action dated Nov. 13, 2009 in 200510128895.8.
Official Action in U.S. Appl. No. 11/066,058 mailed Mar. 18, 2010.
Russian Office Action dated Dec. 18, 2009 in 2006101270.
Official Action in U.S. Appl. No. 11/332,468 dated Jun. 30, 2010.
Chinese Second Office Action dated Jun. 29, 2010 in 200680033069.8.
Chinese Second Office Action dated Jul. 2, 2010 in 200680033162.9.
Office Action mailed Dec. 9, 2008, for U.S. Appl. No. 11/066,083.
Australian Examiner's First Report dated Sep. 21, 2010 in 2006200047.
Australian Examiner's First Report dated Dec. 1, 2010 in 2006287364.
Japanese Notice of Rejection dated Jan. 14, 2011 in 2005-183577.
Japanese Notice of Rejection dated Feb. 4, 2011 in 2005-352580.
Japanese Notice of Rejection dated Feb. 4, 2011 in 2005-367248.

* cited by examiner

PROGRAMMABILITY FOR BINDING DATA

CROSS-REFERENCE TO RELATED APPLICATIONS

This application is a continuation-in-part of U.S. application Ser. No. 11/030,423, owned by Microsoft Corporation and filed with the United States Patent and Trademark Office on Jan. 6, 2005, entitled "Data Binding in a Word Processing Application," which is herein incorporated by reference in its entirety.

This application is related to U.S. application Ser. No. 11/065,754, entitled "Method and Apparatus for Utilizing an Object Model for Managing Content Regions in an Electronic Document," and U.S. application Ser. No. 11/066,058, entitled "Method and Apparatus for Utilizing an Extensible Markup Language Schema for Managing Specific Types of Content in an Electronic Document", each owned by the Microsoft Corporation, filed concurrently herewith and incorporated in their entireties.

BACKGROUND OF THE INVENTION

Markup Languages have attained wide popularity in recent years. One type of markup language, Extensible Markup Language (XML), is a universal language that provides a way to identify, exchange, and process various kinds of data. For example, XML is used to create documents that can be utilized by a variety of application programs. Elements of an XML file typically have an associated namespace and schema.

A namespace is a unique identifier for a collection of names that are used in XML documents to define element/attribute names and types. The name of a namespace is commonly used to uniquely identify each class of XML document. The unique namespaces differentiate markup elements that come from different sources and happen to have the same name.

XML Schemata provide a way to describe and validate data in an XML environment. A schema states what elements and attributes are used to describe content in an XML document, where each element is allowed, what types of content is allowed within it and which elements can appear within which other elements. The use of schemata ensures that the document is structured in a consistent and predictable manner. Schemata may be created by a user and generally supported by an associated markup language, such as XML. By using an XML editor, the user can manipulate the XML file and generate XML documents that adhere to the schema the user has created. In previous word processor applications, support for custom XML schemas was added to the application, enabling users to 'tag' contents of a document with custom XML markup (e.g. <title>), essentially giving semantic meaning to what was previously an unclassified run of text. This meant that a document, which was previously just text with formatting, but no meaning for other applications to process, could now be a structured XML document containing specific pieces of XML markup from any user-defined XML schema that any other XML-aware application could locate and understand.

In a basic example, the text at the top of a document could be 'tagged' as a title with a <title> XML element from a user-defined XML schema, which means that other XML-aware applications can now easily understand that this range of text contains a "title" and extract it appropriately. This enables a backend process to intelligently extract parts of the document with appropriate semantics and context (e.g. this text is the <title>).

However, the drawbacks associated with prior word processor applications stem from the fact that the addition and persistence of custom XML markup is tied to the presentation of the document. That is, in the existing implementations there is an inexorable link between the XML markup of a word processor document (for example, the details of a customer invoice expressed in XML format) and its presentation on the document surface (three paragraphs of plain text followed by a table with 5 columns and 4 rows w/ a specific table style, for example). Therefore, the XML data represented in prior word processor applications (because it is tied to the presentation) must coincide exactly with the content of the document. For example, if the XML schema for the invoice states that <date> comes before <address>, which comes before <phoneNumber>, then those three XML elements must appear in exactly that order as presented in the document. This means that changes to the presentation format (e.g. moving a table row around which contains <date>) will also cause changes to the structure of the XML data contained in that document, which requires extra steps on the part of the solution developer to ensure this data conforms to the structure of the associated XML schema. Thus, the end user of the document is not afforded the freedom to manipulate the presentation freely, because doing so might invariably change the semantics of the data, potentially violating the XML schema for that data.

Additionally, solutions developed on top of prior word processor applications need to more carefully consider the implications of the presentation when attempting to read/write data from a document for a backend application. So, if a paragraph of bold text is tagged as a title, the resulting XML saved by prior word processor applications would look like:

```
<w:p>
    <Title>
        <w:r>
            <w:rPr>
                <w:b/>
            </w:rPr>
            <w:t>This is the title.</w:t>
        </w:r>
    </Title>
<w:p>
```

As shown above, the custom XML tagging is surrounded on both sides by XML tags that are very specific to the prior word processor application—in this example, w:p, w:r, etc. This means that a XML-aware solution which is processing this data must not only understand its own data format (which contains the <Title> element), but must also understand the exact details of the prior word processor application formatting, so it knows to traverse and ignore that information as it is searching for its own data. Accordingly, this kind of implementation still imposes some requirements on the user, because small changes in the look of the text in the document (for example, dragging the contents of the <Title> element into a table cell, etc.) can result in significant changes the location of the custom XML tags within the surrounding word processor's native tags. Thus, a programmer/code developer often needs to write additional code to anticipate and understand where the prior word processor applications is going to put the custom XML elements based on the presentation and deal with all of the various permutations. This means the resulting solution may still need to contain significant logic code for dealing with specific prior word processor application needs.

Programmers/code developers working with the prior word processor applications also need to take into consideration the implications of a document's layout format when considering reading and writing operations. For example, a user might attempt to grab the value of a <StockSymbol> element and use it to place the full name of a company in the <CompanyName> element in the same document as a simple enhancement for a user writing a company report. To maintain the document's integrity, the user needed to consider, both on the reading and writing of the desired data from the document, the current layout format of the document before they could write functional code to perform these actions. For example, the user might need to know if the value they were writing was in a table cell, a bulleted list, etc., in order to construct the prior word processor application's formatting information that, when inserted into the document, would produce the desired result. This is another potential reason for additional coding in order to understand the word processor application's presentation semantics.

Yet another limitation of prior word processor applications is that XML elements' editing behaviors can sometimes be perceived as "fragile." This is partly because, as discussed above, they are limited by the fact that the positioning of the tags on the document surface determines the structure of the XML data based on the user-defined schema. Accordingly, a number of issues may arise. First, typical user operations (e.g. copy/paste from one section to another) may alter the XML structure and render the document invalid according to the associated XML schema. Second, in such word processor implementations, all elements required by the customer-defined XML schema need to be included in some form on the document surface. This means that developers may have a hard time creating associated XML data as a method for carrying around additional information about the document which is not displayed on the document surface, but serves more as metadata. And, third, elements which are semantically unnecessary on the document surface (e.g. non leaf elements which are not marking up mixed content) need to be included as well in such word processor implementations, further increasing the ability of common user operations to modify the XML data.

In many cases, the schema which defines the XML data (for example, the data that comprises a memo document) tends to be rigidly defined by a single standards body in order to facilitate the communication of this data between multiple heterogeneous processing systems. However, in so facilitating the backend communication, often the human readability and editability of the document data is sacrificed, which making it difficult for a user to understand and parse this data. For example, the XML standard might define a standard format for dates, such as: dd-mm-yyyyThh:mm:ss.ssss. All dates are required to be represented in this format to be parsed by XML-aware applications. Obviously, this format is hard for the user to enter correctly, and often clashes with the way in which the user typically enters dates (e.g. many locales typically use mm-dd-yyyy instead of dd-mm-yyyy, etc.).

Thus, what is needed is a way to enable developers to separate the XML data and the presentation of such data in an application, such as a word processor application.

SUMMARY OF THE INVENTION

Embodiments of the invention provide a word processor application, including a schema, for creating word processor documents wherein the data and presentation can be separated. More particularly, data can be entered into and extracted from a word processor document which is stored in a separate location from the presentation format of the word processor document. According to embodiments of the invention, users of the word processor application can create a separate storage location for the word processor document data and establish links (or bindings) between the contents of that data and the presentation surface.

According to embodiments of the invention, an object model allows code to be developed using a programming environment. The code can be used to manipulate one or more data bindings in an application. Code may also be developed using a programming environment for reacting to changes, in either direction, of a content region or a node in XML data. Code may be developed to define relationships between file content and content within a data store. Additionally, code may be developed that reacts to changes within a bound region of a file or within a data store, trapping or intercepting events, such as edits, additions, deletions, etc. Embodiments of the invention enable a user to write code a single time with the associated XML, and the code is now portable to file types that support the use of XML constructs without worrying about the exact semantics of a target application, thereby greatly simplifying and streamlining application development.

DETAILED DESCRIPTION OF PREFERRED EMBODIMENTS

Figure 1:
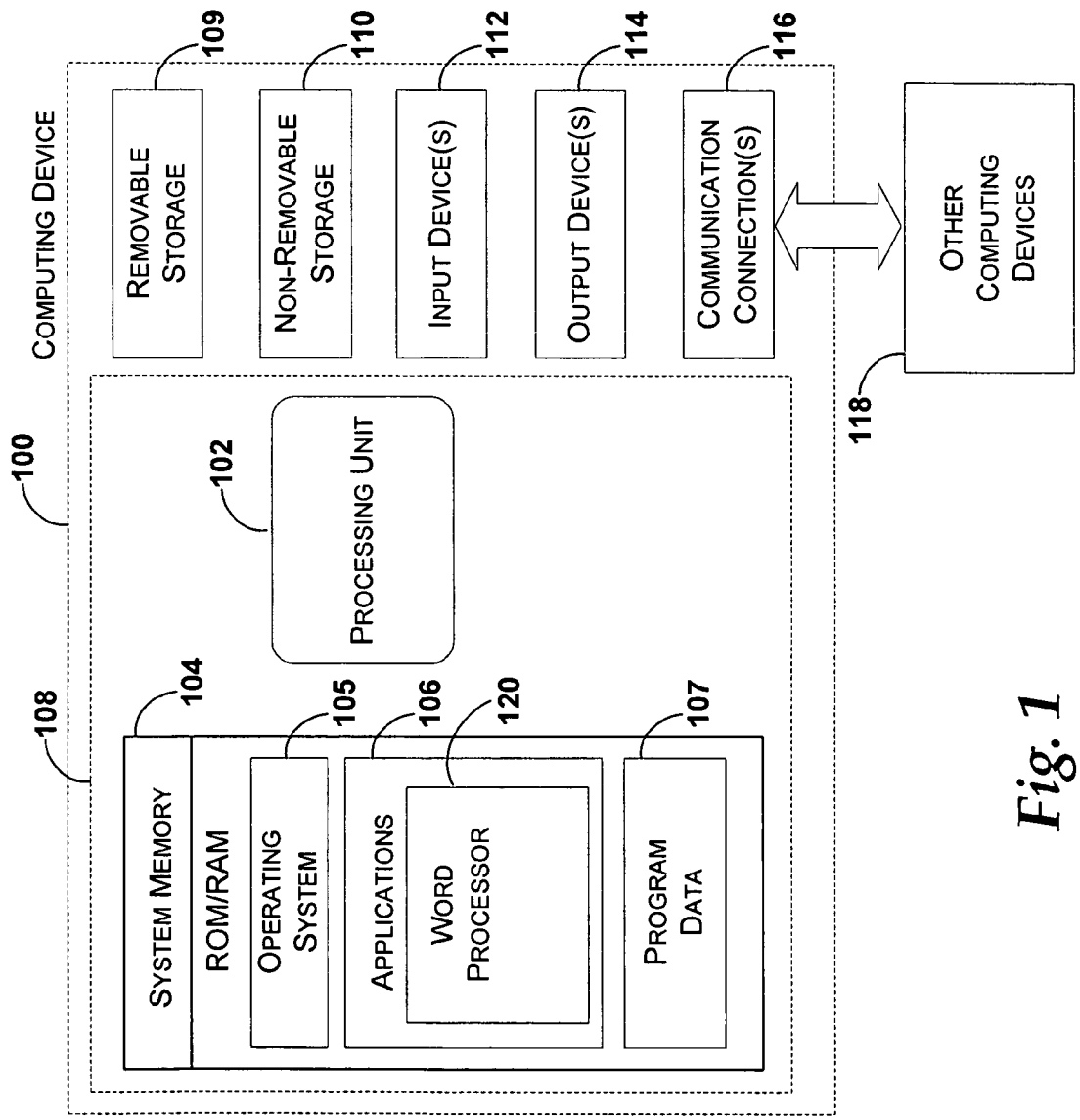
FIG. 1 illustrates an exemplary computing device that may be used in one exemplary embodiment of the present invention.

Throughout the specification and claims, the following terms take the meanings explicitly associated herein, unless the context clearly dictates otherwise.

The term "data" refers to any supplementary information which is carried with, referred to, or used by the word processor document. This information is often large and is likely not exposed on the presentation layer of the document in its entirety.

The terms "markup language" or "ML" refer to a language for special codes within a document that specify how parts of the document are to be interpreted by an application. In a word processor file, the markup language specifies how the text is to be formatted or laid out.

The term "element" refers to the basic unit of an XML document. The element may contain attributes, other elements, text, and other content regions for an XML document.

The term "presentation" refers to the visible portion of the document—the text and layout that would appear if the document were printed.

The term "tag" refers to a character inserted in a document that delineates elements within an XML document. Each element can have no more than two tags: the start tag and the end tag. It is possible to have an empty element (with no content) in which case one tag is allowed.

The XML content between the tags is considered the element's "children" (or descendants). Hence other elements embedded in the element's content are called "child elements" or "child nodes" or the element. Text embedded directly in the content of the element is considered the element's "child text nodes". Together, the child elements and the text within an element constitute that element's "content".

The term "attribute" refers to an additional property set to a particular value and associated with the element. Elements may have an arbitrary number of attribute settings associated with them, including none. Attributes are used to associate additional information with an element that will not contain additional elements, or be treated as a text node.

The term "content region" refers to a bounded and/or optionally labeled region of a document which serves as a container for a type of content entered by a user. See "Methods, System, and Computer-Readable Medium For Managing Specific Types of Content In An Electronic Document," filed on Sep. 30, 2004 and assigned U.S. Ser. No. 10/955,612, by the present assignee, which is hereby incorporated by reference in its entirety.

"XPath" is an operator that uses a pattern expression to identify nodes in an XML document. An XPath pattern is a slash-separated list of child element names that describe a path through the XML document. The pattern "selects" elements that match the path.

The term "XML data store" refers to a container within the word processor document which provides access for storage and modification of the data (in XML format, for example) stored in the word processor document while the file is open.

The term "data binding" refers to a property on a content region which determines the XPath location in one or more pieces of XML data inside a word processor document where the contents of the content region may be stored. As used herein:

"ref"—refers to a unique integer for the referencing a central storage of the following set of properties used by the individual bindings (used when opening/saving the document to a file);

"ID"—refers to the unique ID specifying specific XML data within the XML data store;

"selectionNamespaces"—refers to the prefix mappings (which associate a namespace with a short abbreviation) for the associated XML document in the XML data store; and, "rootURI"—refers to the root namespace of associated XML document in the XML data store.

Illustrative Operating Environment

Embodiments of the invention provide a word processor application for creating word processor documents wherein the storage of XML data and presentation can be separated. More particularly, data which can be entered into and extracted from a word processor document is stored in a separate location from the presentation format of the word processor document. Accordingly, users of the word processor application can create a separate storage location for the XML data contained within a word processor document and establish links (or bindings) between the contents of that data and the presentation surface, enabling the user to edit the associated XML data by editing the contents of the presentation, but by the same token, preventing the user from changing the structure of the associated XML data. For example, the data for an invoice can be stored separately as XML in the word processor file format so that moving around the positions of the links in the document does not change the structure of the separate data store. Thus, backend processing of this structured data is made easier, as the data now has a known structure which is unaffected by the way the user edits the document. A user can edit the data, format the data, including rich presentation formatting, etc. in the word processor document, and only the changes to the text content is 'pushed' back to the XML data stored behind the document. According to the invention, however, all the data updated that are made via user interaction with the word processor document are available in an original native stream of XML. The invention therefore also enables the modification of the contents of a word processor document by directly changing the linked XML data without having to deal with the complexity of the presentation format of that data, which again can be constantly changing. In so doing, it greatly simplifies the addition, editing, and extraction of structured data in a word processor document.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include a word processor application 120. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

A number of program modules and data files may be stored in the system memory 104 of the computing device 100, including an operating system 105 suitable for controlling the operation of a networked personal computer, such as the WINDOWS XP operating system from MICROSOFT Corporation of Redmond, Wash. System memory 104 may also store one or more program modules, such as word processor application 120, and others described below. Word processor application 120 is operative to provide functionality for creating, editing, and processing electronic documents.

According to one embodiment of the invention, the word processor application 120 comprises the WORD program from MICROSOFT Corporation. It should be appreciated, however, that word processor application programs from other manufacturers may be utilized to embody the various aspects of the present invention. It should further be appreciated that the various aspects of the present invention are not limited to word processor application programs but may also utilize other application programs 106 which are capable of processing various forms of content (e.g. text, images, pictures, etc.), such as spreadsheet application programs, database application programs, presentation application programs, drawing or computer-aided application programs, etc.

Embodiments of the invention may be implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Binding Data in a Word Processor Application

Figure 2:
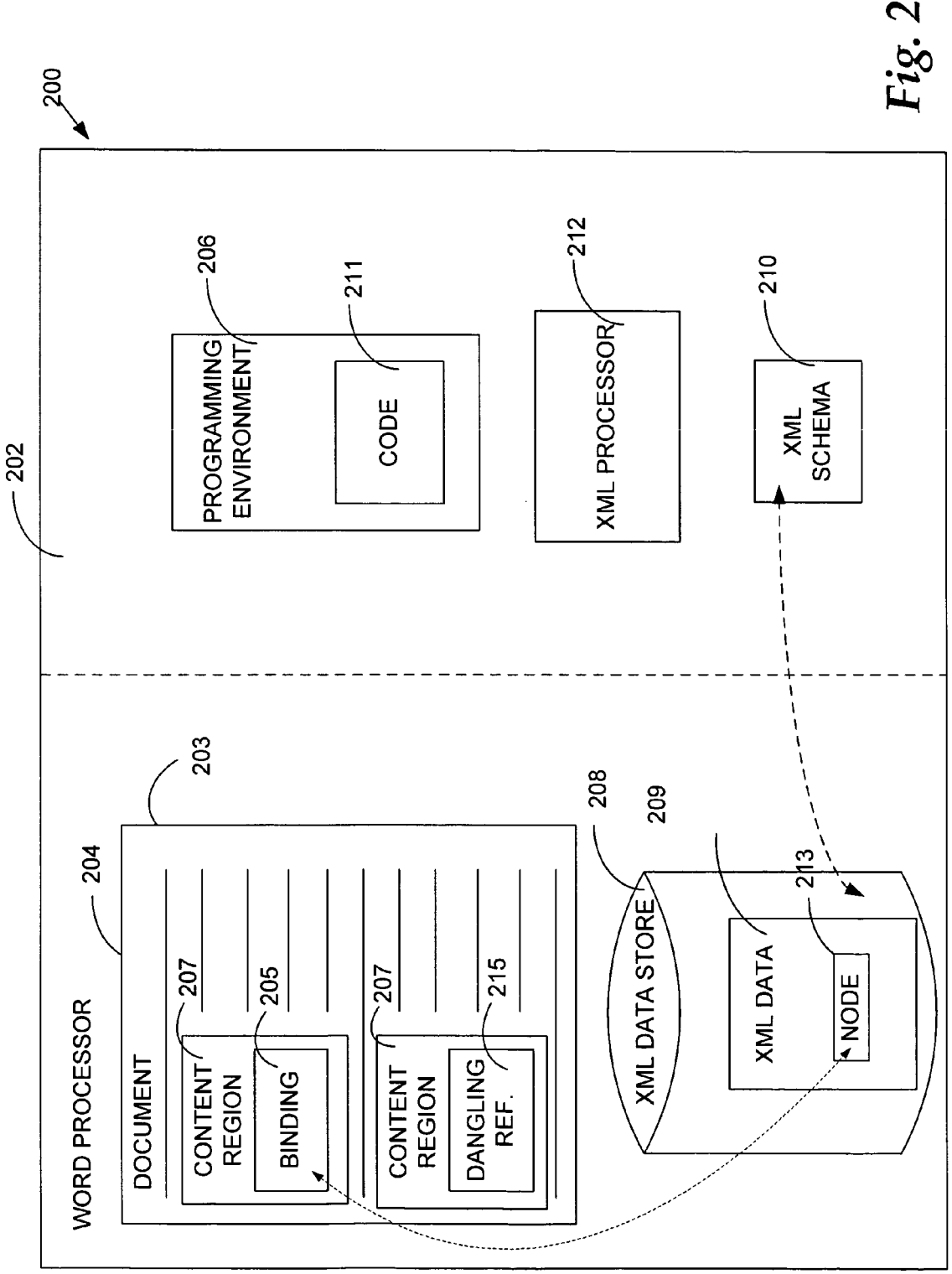
FIG. 2 is a block diagram illustrating an exemplary environment for practicing the present invention.

FIG. 2 is a block diagram illustrating an exemplary environment for practicing embodiments of the present invention. The exemplary environment shown in FIG. 2 is a word processor environment 200 that includes a word processor application 202, word processor document 204, programming environment 206, data store 208, schema file 210, and XML processing module 212. However, as described above, the invention is also applicable to other application programs 106 capable of processing various forms of content (e.g. text, images, pictures, etc.), such as spreadsheet application programs, database application programs, presentation application programs, drawing or computer-aided application programs, and others. The programming module 206 can provide a simple application programming interface (API) for the XML processing module 212, which allows the development of code that modifies the content of either the document 204 or the XML data store 208 contents. It will be appreciated that the invention is not intended to be limited by any particular embodiments or examples described herein. For example, the word processor environment may include a plurality of word processor documents 204, data stores 208, and/or schema files 210. According to an embodiment of the invention, the XML processing module 212 is used by word processor application 202 for processing data formatted according to the Extensible Markup Language. A suitable XML processing module 212 is MSXML manufactured and marketed by MICROSOFT Corporation of Redmond, Wash.

The word processor application 202 includes its own namespace or namespaces and a schema 210, or a set of schemas, that is defined for use with document(s) 204 associated with word processor application 202. The set of tags and attributes defined by the schema 210 for word processor application 202 define the format of document 204. As described below, and according to embodiments of the invention, the data store 208 may include data 209. Preferably, the schema 210 is attached to the data 209 within the data store 208. The word processor document 204 also includes content regions 207 created by a user, as described below. More than one data store 208, associated XML data 209 and schema 210 may be included as part of the word processor application 202. In order to provide XML data 209 with a set of grammatical and data type rules governing the types and structure of data that may be included in a given XML data 209, one or more XML schema 210 may be associated with the XML data 209 for providing the rules governing each of the XML elements and tags with which the user may annotate the given XML data 209. The schema 210 includes the rules governing the order with which those elements may be applied to the XML data 209 and specific rules associated with individual elements applied to the XML data 209.

Embodiments of the invention provide a word processor application 202 operable to create word processor documents 204 wherein the data and presentation can be separated via the presence of a separate data store 208 which is stored with the word processor document. More particularly, data which can be entered into and extracted from a word processor document 204 is stored in one or more XML data 209 files within the document's data store 208, thereby separating the data from the presentation format of the word processor document 204. Accordingly, users of the word processor application 202 can create a separate storage location for the data of a word processor document 204 and establish links (or bindings) 205, associated with one or more content regions 207, between the contents of that data and the presentation surface 203, enabling the user to edit the data by editing the contents of the presentation, but by the same token, preventing the user from changing the structure of the data 209. Moving around positions of the content regions 207 in the document 204 does not change the structure of the XML data 209 in the separate data store 208. Moreover, changes made to the data presentation, bold, italic, justification, etc. do not affect the data structure. Thus, backend processing of the structured data is simplified since the XML data 209 corresponds to a known structure which is unaffected by the way a user edits the document 204.

Embodiments of the invention enable the modification of the contents of a word processor document 204 by directly changing the linked data without having to deal with the complexity of the presentation format, which can be constantly changing. In so doing, it greatly simplifies the addition, editing, and extraction of structured data in a word processor document 204. Moreover, data bindings 205 bound to structured XML data 209 may be moved around in the document 204 without affecting the structure of the data. The data bindings 205 on the content regions 207 are preferably enabled using an XPath expression, which may be defined via a user interface or programming window 206.

A user uses the XPath expression (a standard XML method for identifying a node 213 in an XML tree) to uniquely identify a desired XML node 213 which the document content region should be bound to. The word processor application 202 operates to automatically parse and use the XPath to locate the desired target for the data binding region. This also means that developers familiar with the XPath standard can leverage this use of XML to create data bindings 205 which are semi-dynamic in nature. That is, identifying a different target node 213 based on other changes to the data 209 or changes to the presentation 203. For example, suppose a user wants to display the name of the employee who has completed the most sales in a given time period. If this information was in the XML data 209 associated with a document 204, a user can create an XPath expression which links to the name of the individual with the highest number of completed specifications, and that link automatically shifts to the appropriate location (node 213) as the data changes. The link can also be changed between nodes 213 through the use of code 211, the user interface, or a programming environment 206.

Alternatively, a user can create a data binding which uniquely identifies the object representing node 213 in the data 209 which the document content region 207 may be bound to. The word processor application 202 operates to automatically determine the XPath to locate the desired target for the data binding region. However, this means that in this case, the data binding 205 will have its XPath updated automatically to ensure that the data binding 205 points at the same object, as opposed to the same XPath expression.

Programming code 211, as described briefly above, may be developed to utilize the XML processing module 212 and react to changes moving in either direction (i.e. from a content region 207 on the document surface 203 to a node 213 in the XML data 209 in the data store 208, and vice versa). A user can develop code 211 that defines relationships between the document surface 203 and specific content within the data store 208. Moreover, code 211 can be developed that reacts to changes within a bound region of the document 204 or within the data store 208, trapping or intercepting events, such as edits, additions, deletions, etc. For example, suppose a user wants to ensure that not more than one document can use a specific title. The code 211, based on what is input into the title node, might check against a central database whether the title is already being used. If the title is taken, the code 211 may prompt the user to enter another title and/or alert the user that the title is unavailable. Embodiments of the invention enable a user to write code 211 a single time with the associated XML, and the code is now portable to all document types that support the use of XML constructs without worrying about the exact semantics of the target application, thereby greatly simplifying and streamlining application development.

According to embodiments of the invention, a word processor document 204 may be tagged with content regions 207 representing semantics for specific regions of text (e.g. Title, Body, etc.) and by adding a data binding 205 the associated text within that content region 207 is now stored in a node 213 inside some XML data 209 in the data store 208 within the document 204. The data 209 is linked to the content region 207 in the document, i.e. tagged regions, using one or more data bindings 205. Accordingly, data 209 can now be stored in a consistent location ("data store") in its own XML stream regardless of where the data binding 205 locates the associated content in the presentation 203, i.e. the digital representation that a user interacts with when editing a particular document (e.g. a WORD window depicting a particular user document) of the document 204 or how that data 209 is presented. Thus, a user does not have to worry about data being moved around in the document 204, because the XML data 209 is now located within the data store 208 in a consistent location. Moreover, the data store 208 can contain data 209 which is not referenced by a data binding 205 within a document 204. The "extra" data, such as metadata, etc., provides additional information to users, such as solution developers, which may not be relevant to the document user.

According to embodiments of the invention, the structure of the data is kept in a separate location, one or more pieces of XML data 209 within the document's data stores 208, thereby enabling the user to move around links (i.e. data bindings 205) in the presentation 203, without affecting the data structure. Accordingly, the structure of the XML data 209 does not change, just the presentation of the XML data 209 associated with the word processor document 204 changes. Thus, changing the format of the data presentation in the document 204, does not affect the structure of the data store 208. The user is not moving the actual data 209 by manipulating the document surface 203—thus the user has complete control over the presentation without having to be concerned about ramifications to the data 209, which is being maintained separately in the store 208. Thus, embodiments of the invention allows users to access custom XML information separate from the presentation information.

The one or more data bindings 205 can be used to "bind" content of a data source (XML data 209 in the data store 208), herein termed XML data 209, to locations in the document 204. XML data 209, as used herein, includes any type of content such as text (plain or richly formatted), images, content of a specific type (dates), etc. The structure of a data binding 205 may be described as an XPath link, which allows the word processor application 202 to connect to/synchronize with/persist links to XML nodes 213 in an XML data store 208 associated with a document 204. The XML data store 208 is most preferably a part of the document 204 (i.e. the store 208 is saved to with the word processor file and travels or associates with the particular document 204). A data binding 205 may also contain information to control how the data 209 should be transformed between the presentation (the word processor's document surface 203, for example) and the data store 208. A user of the word processor application 202 can allow the data 209 stored in the data store 208 (the data that is manipulated by the backend applications) to be stored in a standard format, but present the same information in a word processor document 204 in a friendlier format (e.g. the user sees Jan. 29, 2004, but the data is stored in dateTime format as 29-01-004T12:00:00.0000). As another example, the data binding information can contain an image—to the data 209 this image is represented as a seemingly meaningless string of characters, but the same transformation principle described above means that the user will see an image in the content region 207 of the word processor document 204. The user can add/change the image and the XML-encoded representation will be persisted to the XML data 209 so that any backend process can store/manipulate that information.

According to an embodiment, when a user adds data binding information 205 of a content region 207, the user provides the linked XML data 209 of interest (identifying one or more nodes 213, for example) by specifying the XPath expression. Once bound, the content of this content region 207 will be linked or bound to the content (XML data) of the node 213 returned by that XPath. Consequently, this means that if an XML node 213 is added/removed/changed in such a way that the XML node 213 returned by the XPath changes, then the content of the content region 207 in the document 204 updates automatically. Alternatively, if a change occurs which results in no node 213 being returned by a particular data binding 205, then the data binding 205 goes into a 'dangling reference' state, described below.

For example, suppose a document 204 includes the following paragraph, where "Microsoft Corporation" corresponds to a plain text content region 207 (shown in italics) bound to the XPath/contract(1)/header(1)/company(1) in some linked XML data 209 within the data store 208 for that document. The paragraph displayed on the presentation 203 is:

"Microsoft Corporation is located at One Microsoft Way."

According to one embodiment, a link can be set up by specifying a single line of code in a programming environment 206 (for example):

Document.ContentRegions.Add( ).DataBinding.Add("/contract(1)/header(1)/company(1)")

The corresponding linked XML data 209 might look like (with the linked to node 213 depicted in single quotes):

```
<contract>
    <header>
        '<company>Microsoft Corporation</company>'
        <company>Contoso Corporation</company>
    </header>
</contract>
```

Suppose now that a user uses the data store 208 API to add a new <company> node 213 as the first child of <header> (new node 213 in single quotes):

```
<contract>
    <header>
        '<company>Fabrikam Corporation</company>'
        <company>Microsoft Corporation</company>
        <company>Contoso Corporation</company>
    </header>
</contract>
```

The resulting binding 205 on the content region 207 is still bound to the same XPath ("/contract(1)/header(1)/company(1)"), so the document content would immediately update to show the new contents of that node 213:

"Fabrikam Corporation is located at One Microsoft Way."

According to the invention, if one or more regions of a word processor document 204 contain data bound content regions 207, the document 204 reacts to changes to either source of the linked content. Accordingly, if a range of the document 204 is data bound, then changing the contents of the XML node 213 in the associated XML data 209 will result in an automatic change to the text of the content region 207. Correspondingly, if a range of the document 204 is data bound, then changing the text of that bound content region 207 in the document 204, results in an automatic change to the contents of the XML node 213 in the corresponding XML data 209. That is, multiple content regions 207 with identical bindings 205 may exist in multiple places in the document 204. For example, a content region 207 with a data binding 205 to a name may be added to the header as well as the body of a document 204. Changing either of these locations synchronizes that text with the XML data store 208, which will in turn reflect that change wherever a content region 207 with a data binding 205 to that node 213 exists in the document 204.

An XML node 213 in the XML data 209 can have a one-to-many relationship with the document 204, which means that the same XML node 213 in the XML data 209 can be referenced by multiple data bindings 205. Whenever the data bound content region 207 in the document 204 is updated, it causes a change to the appropriate XML node 213 in the XML data 209, which in turn causes all other associated bindings 205 in other content regions 207 in the document 204 to be updated with that new text. For example, suppose a content region 207 in the header of the document 204 is contains a data binding 205 specifying the XPath expression for a <title/> node in some XML data 209 and another content region 207 in the body of the document 204 also contains a data binding 205 to that same element. According to the invention, both will display the same content, even though they may have different formatting. If a user edits the content in the content region 207 in the body of the document 204, that update will be persisted to the appropriate XML node 213 in the appropriate XML data 209 in the data store 208, causing all other content regions 207 with associated bindings 205 in the document 204 (e.g. in the header, footer, etc.) which also specify that XML node 213 to update. Embodiments of the invention provide a mechanism for binding multiple locations in the document to a single XML node 213 in the data store 208, now linking the content of all three of those locations to a single source of data. Accordingly, the contents of all content regions 207 in the document 204 which are linked to the same node 211 in the XML data 209 are identical.

An illustrative example of this is a typical report document, where the user might normally have the title displayed in several locations: on the cover page (in large bold text), in the header (in smaller text), and in the footer (in smaller italicized text). Normally, the user would have to type out the title in each location, ensuring that if the title is changed in any one of these three locations that they remember to change it in the other two (to keep the content consistent). However, it is all too easy to forget to keep all three of these locations in sync. According to an embodiment of the invention, once a data store 208 is in place that contains XML data 209 that the user wants to display in the document 204, multiple locations in the document (e.g. the three locations discussed above) can all be content regions 207 data bound to a single XML node 213 in the data store 208.

Thus, the content of all three locations are linked or bound to a single source of data 209. This means that the user, by changing the contents of any one of these regions (e.g. the cover page) will automatically cause the user's text to be pushed to the underlying XML data 209, and then in turn pushed to the other locations in the document 204 having content regions 207 with corresponding data bindings 205 (in this case, the header and the footer). This means that the user, insofar as their interaction with the document, has now linked or bound these three ranges of content so that they are all identical. According to the embodiments of the invention, the regions of the document can be presented in multiple ways (large and bold, small and italicized, etc.), but the data structure in the data store 208 remains the same.

Dangling References

According to an embodiment of the invention, users can also specify XPath expressions that do not have a target—their specified target XML node 213 does not exist in the XML data 209 in the data store 208. The data binding 205 does not 'forget' its desired target node 213, rather it goes into a 'waiting' state, where it is not connected to any specific XML data 209, but is waiting to see if the desired node 213 appears in the XML data 209 in the backing XML data store 208. This is particularly useful for document assembly scenarios, where each part of a document 204 (for example, a standard cover page, end page, and reused clauses) may contain data bindings 205 which should only be populated when these parts are assembled into a single final document 204. In this case, the document creator specifies data bindings 205 within content regions 207 in each of the document 'parts' to XML nodes 213 in the XML data 209 which did not exist in that part (for example, the cover page might contain a content region with a binding 205 to a <Title/> XML element and a <Date/> XML element). When the part is viewed outside of its target document, those bindings are not connected, as no XML data 209 exists, but as soon as the part is added to a document which does contain the desired data 209, the data bindings 205 immediately connect (synchronize) to the data 209 and display the correct content—allowing the document creator to specify bindings 205 and save them even though the data 209 has not yet been generated.

One type of dangling reference 215 occurs when a data binding 205 on a content region 207 cannot be successfully linked to a node 213 in a linked XML stream, (i.e. a state of a binding in a content region). When a node 213 is replaced/removed from a linked XML stream, one or more data bindings 205 may become dangling references 215 as a result. Preferably, if a data binding 205 has a dangling reference 215 due to its XPath, the word processor application 202 continues to store the last known XPath for the node 213 on the data binding 205. This can occur when the XPath no longer resolves to any node 209. Each time the data store 208 messages an update of some XML data 209 to the word processor document 204, the word processor application 202 checks if any dangling references 215 are resolved by the latest update (i.e. the XPath now points to a valid node 213 in the XML tree). If the word processor application 202 resolves a dangling reference, the content of the data store 208 preferably takes precedence over the content currently in the data binding 205—that is, the content of the data binding 205 is replaced by the content in node 213 in the data store 208. Dangling references are preferably exposed using a simple API layer, accessible through one or more programming environments 206.

As an example, suppose a word processor document 204 includes the paragraph below, where Microsoft Corporation corresponds to a plain text content region 207 data bound to the XPath/contract/header/company(3) in some XML data 209:

"Microsoft Corporation is located at One Microsoft Way."

The corresponding XML data 209 might look like (with the linked to node 213 in single quotes):

```
<contract>
    <header>
        <company>Fabrikam Corporation</company>
        <company>Contoso Corporation</company>
        '<company>Microsoft Corporation</company>'
    </header>
</contract>
```

If a user, such as a developer, uses the data store's 208 API to remove the first <company> node 213 under <header> (node 213 in single quotes):

```
<contract>
    <header>
        '<company>Fabrikam Corporation</company>'
        <company>Contoso Corporation</company>
        <company>Microsoft Corporation</company>
    </header>
</contract>
```

The resulting data binding 205 on the content region 207 in the document 204 maintains a link to the same XPath, so the data binding 205 becomes a dangling reference 215 to the now non-existent \contractheader\company(3):

```
<contract>
    <header>
        <company>Ford Corporation</company>
        <company>Intel Corporation</company>
    </header>
</contract>
```

This means that internally we have a broken link, but in accordance with the invention, the content of the content region 207 does not change, and no errors occur, i.e., "Microsoft Corporation is located at One Microsoft Way."

When some XML data 209 is replaced or removed (or when a link is moved from one document to another), then all data bindings 205 which reference that XML data 209 immediately become dangling references 215 pointing to the deleted XML data 209. If a data binding 205 contains a dangling reference 215, the word processor application 202 continues to store the last known XPath/namespace link associated with the data binding 205. According to an embodiment of the invention, when a set of data bindings 205 become dangling references 215, the word processor application 202 attempts to reattach these links to any other available XML data 209 in the associated XML data store 208. If any of the data bindings 205 do resolve to a node 213 in another XML data 209, then all of the dangling references 215 associate to this XML data 209, updating the associated content regions 207 for which data bindings 205 are now connected. If this XML data 209 does not result in valid data bindings 205 for any of the dangling references 215, the word processor application 202 performs a similar check with each XML data 209 in the data store 208, etc. If none of the XML data 209 can be used for the dangling references 215, then the bindings remain dangling references 215 to the original XML data 209.

Figure 3:
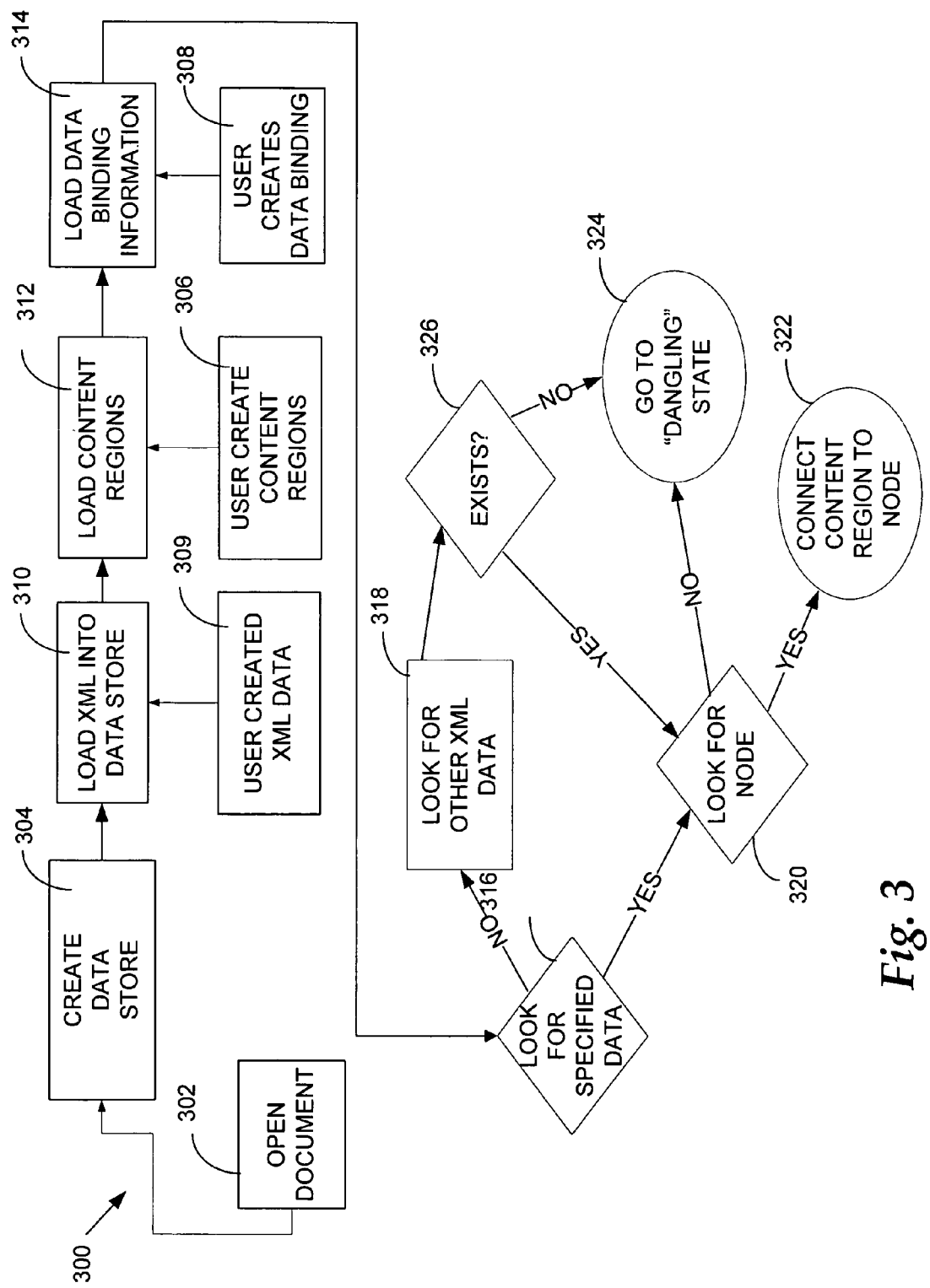
FIG. 3 is a flow diagram according to an embodiment of the present invention.

Referring to the flow diagram depicted in FIG. 3, and with continuing reference to FIG. 2, an embodiment of the invention is described. The process 300 shown in FIG. 3 begins at 302 when a user opens a word processor document 204, using a word processor application 202. At 304, the word processor application creates a data store 208, which is then in 310 populated with any XML data 209 stored in the word processor document 204 or requested by using user interface or programming window 206. The data store 208 is preferably included as part of the document 204, but is not visible on the document editing surface 203. It will be appreciated that the data store 208 may be loaded before creating the content regions 207 and data bindings 205. Likewise, the content regions 207 can be created before the data store 208. In other words, the various operations depicted in FIG. 3 do not have to be carried out in any particular order and can be implemented according to a particular user's preference.

At 306, the user creates one or more content regions 207 which exist on the surface 203 of the document 204. Note that these content regions can also be read from the existing contents of the document 204. At 308, the user can associate data binding information with a content region 207, by providing a particular linked XML data 209 and an XPath expression specifying the target node 213. The one or more data bindings link one or more nodes 213 of XML data 209 in the data store 208 to one or more content regions 207. The data binding 205 becomes bound or dangling. As described above, each node 213 may be bound to a plurality of content regions 207, each one specifying a data binding 205 to the same XML node 213. Moreover, the data bindings 205 may be linked to multiple data stores 208. At 309, the user may create XML data, either in a content region 207 or the date store 208. At 310, the word processor application 202 loads all XML data into a data store 208. At 312, the word processor application 202 loads the content regions 207 from the document 204 or as requested by the user 306, and at 314, the word processor application 202 loads the data bindings 205 from the document 204 or as requested by the user 308. At 316, the word processor application 202 checks to see if the XML data 209 associated with node 213 specified by a particular data binding 205 exists.

If the XML data 209 does not exist, at 318, the word processor application 202 determines whether other XML data 209 exists within the same XML namespace. If the XML data 209 is located within the data store at 316, at 320, the word processor application 202 determines if the associated XML node 213 for the specified XPath exists. If the XPath exists, at 322, the word processor application 202 connects the various document content, i.e. content regions 207 and any other linked content, to the associated XML node or nodes 213 via the data binding. If the XPath is not located at 320, the word processor application 202, at 324, labels the particular data binding 205 as a dangling reference 215 (enters the dangling state). If at 318, other XML data 209 is found in the same XML namespace within the data store 208, at 326, the word processor application 202 again checks to see if the XML node 213 exists within that data.

If the XML data 209 does not exist, the word processor application 202 labels the particular data binding 205 as a dangling reference (enters the dangling state) at 324. If the XML data 209 is found to exist at 326, then at 328, the word processor application 202 searches for the desired XPath within that XML data 209. If the node 213 is found, at 320, the word processor application 202 connects the document content, i.e. content regions 207 and any other linked content, to the associated XML node or nodes 213 at 322.

Object Model for Binding Data

Figure 4:
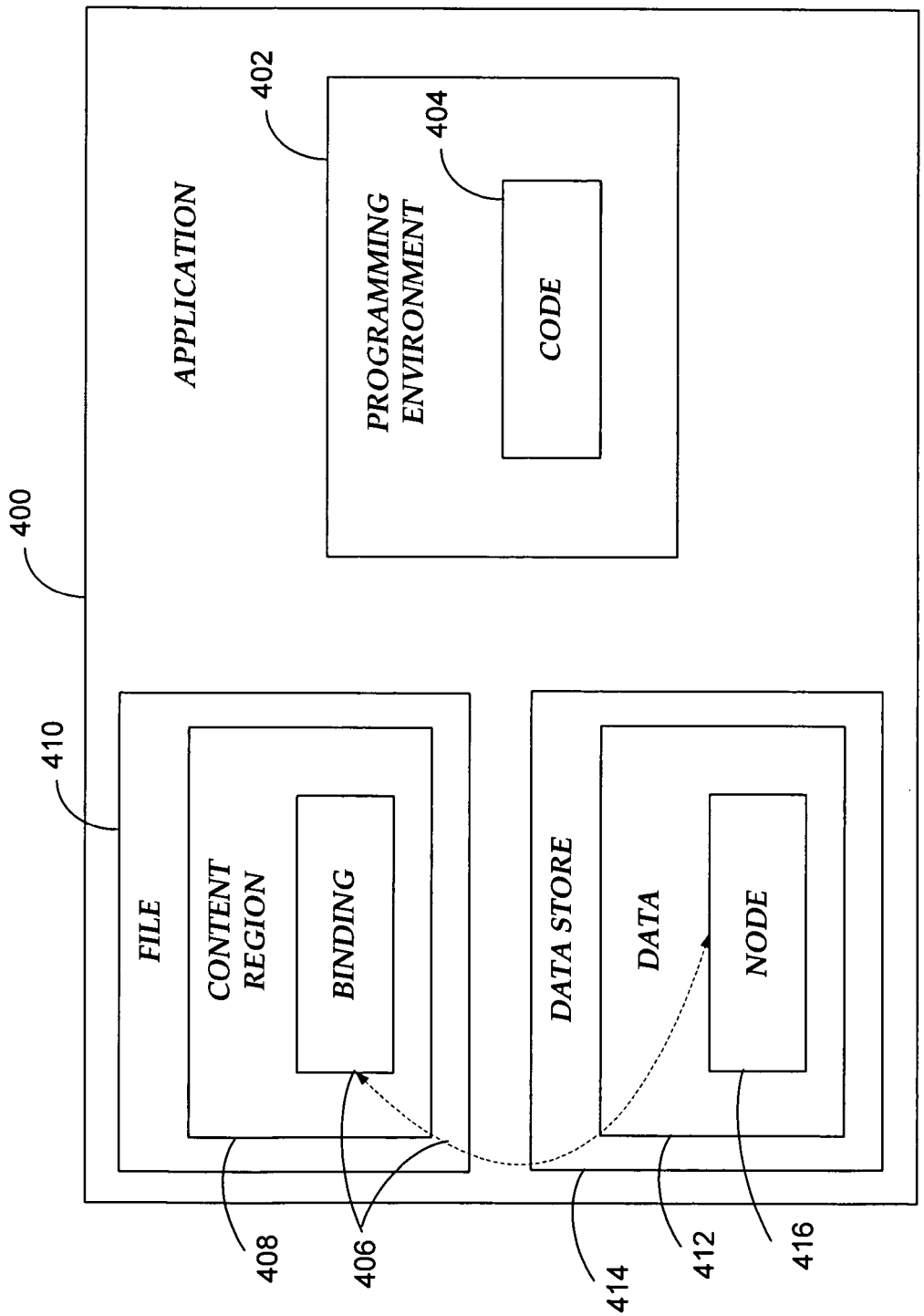
FIG. 4 is a block diagram illustrating another exemplary environment for practicing the present invention.

Referring now to FIG. 4, another embodiment of the invention is described. Object models can be used in many software applications to provide a way for code to automate tasks that a user may perform through a user interface of an application, such as application 400. The object model allows code to be written which, for example:

Automates repetitive tasks for the user,

Reacts to (validates, etc.) actions by the user, and/or

Performs automatic actions when a file 410 is opened/edited/saved.

For example, applications (for example, WORD 2003) provide an object model interface which gives access to all of the functionality of the word processor's user interface via code. It does this by providing structures which provide code access to equivalents of all of the paradigms/user interfaces of the word processor application. The structures are organized into four basic categories:

Objects: correspond to actionable objects within an application—for example, a paragraph could be represented as an object in the object model corresponding to the user's paragraph in the document surface.

Methods: Actions that can be performed on an object (e.g. delete).

Properties: Things that can be set about an object (e.g. bolding a paragraph).

Events: correspond to subroutines that are run in response to a user's (or other code's) interaction with an application (e.g. code can register to listen to a file open event, and the application can notify this code (allowing a user to perform any action) whenever a file is opened in the application, whether by the user, or by other code).

Any object within an application's object model can expose methods, properties, and/or events which allow code to manipulate that object.

An application 400 which includes a programming environment 402 in accordance with an embodiment of the invention is described. The programming environment 402 provides code access via the object model to objects in the application 400, such as a word processor application 202 described above. It will be appreciated that embodiments of the invention have been described in the context of word processing applications, but as described above however, the invention is not intended to be limited to any specific application. The programming environment 402 is further operable to provide control over behaviors of content regions 408 while availing a robust set of methods/properties/events for trapping changes to content of a content region 408. Additionally, the programming environment 402 enables a user, such as a programmer for example, to programmatically access one or more data bindings 406 that provide links between one or more content regions 408 and one or more nodes 416 of a data store 414.

As described above, code 404 may be developed using the programming environment 402 for reacting to changes, in either direction, of a content region 408 or a node 416 in XML data 412. Code 404 may also be developed to define relationships between file content and content within the data store 414. Additionally, code 404 may be developed that reacts to changes within a bound region of a file 410 or within the data store 414, trapping or intercepting events, such as edits, additions, deletions, etc. Embodiments of the invention enable a user to write code 404 a single time with the associated XML, and the code is now portable to all file types that support the use of XML constructs without worrying about the exact semantics of a target application, thereby greatly simplifying and streamlining application development.

The programming environment 402, such as an application programming interface (API), exposes objects and provides the ability to use code 404 to manipulate one or more data bindings 406 within the application 400. One or more data bindings 406 may be associated with one or more content regions 408 of a particular file 410.

Content region properties preferably return objects providing two events for manipulating the behaviour of data bindings:

.BeforeStoreUpdate(ContentRegion As ContentRegion, Content As String) An event that returns an object (a string) whenever content of a content region is modified, and before text is sent to an appropriate node 416 in XML data 412. This allows code 404 to manipulate the string before it reaches the XML data's node without changing the content of a content region 408.

.BeforeContentUpdate(ContentRegion As ContentRegion, Content As String) raises an event whenever there are changes to content of a node 416 in XML data 412 that is linked to an associated content region 408, before the content region 408 is updated. This allows code 404 to manipulate data 412 before being displayed in a content region 408 without changing the node's data.

Preferably, a content region 408 includes properties, including a "DataBinding" property, accessible through the programming environment 402. The DataBinding property provides access to relationships between content regions 408 and data 412 of a data store 414 associated with the file 410. The DataBinding preferably returns DataBinding objects (properties, methods, and events), allowing manipulation of a data binding 406 and other data and objects associated with the data binding 406. Representative methods and properties include, but are not limited to:

.CustomDataStream As CustomDataStream

A property which returns an object representing XML data 412 associated with a data binding 406 (for further manipulation). Code 404 an be developed to use the object model to manipulate XML data directly. Returns nothing if dangling reference.

.CustomDataXMLNode As CustomDataXMLNode

A property which returns an object representing XML node 416 within XML data 412 that is the target of a data binding 406. Code 404 can be developed to manipulate a target node 416 of a particular data binding 406. Returns nothing if dangling reference. As an example, suppose a user wants to move a node 416 to change the target of a data binding 406. As another example, suppose a user would like to delete a node 416 because the file 410 is about to go onto some public server. Thus, code 404 can be used to find the node 416 using this returned object and delete the node 416, preventing information from being inadvertently transmitted when the file 410 is put on the public server.

.Delete As Void

A method which returns an object for removing a data binding 406 from a content region 408. For example, suppose a file 410 includes a content region 408 with a name that is linked (or data bound) to a name element in XML data 412. Code 404 may be used to delete the binding 406 (i.e. "dataBinding.Delete"), because a user wants to freeze the data 412, thereby operating to remove the link from the content region 408.

.IsBound As Boolean

A property which returns an object for determining whether a data binding 406 is currently a dangling reference or not. Code 404 may be used to determine whether a target node 416 exists. In various circumstances, for a successful code implementation, it is preferred to determine whether a target node exists, i.e. is a data binding 406 dangling or active. If a target node exists the object returns a ".true", otherwise ".false" if dangling reference or no binding present.

.SetBindingByNode(CustomDataXMLNode as CustomDataXMLNode) As Boolean

A method which returns an object (CustomDataXMLNode) for creating/changing a data binding 406 on a content region 408, by providing a target XML node 416 for a particular link. If a binding exists, the existing binding is replaced and the store content of a new bound node (if any) replaces the existing content. Returns ".true" if bound to a live node, ".false" if not bound to a live node.

.SetBindingByXPath(CustomDataStream as Variant, XPath as String, [PrefixMapping As String]) As Boolean A method which returns an object (CustomDataStream, XPath, and/or PrefixMapping) representative of information (such as an XPath, a pointer (ID) to a node, and/or prefix mappings related to a namespace) used to create a data binding 406 on a content region 408, by providing an XPath and XML data 412 for a link.

CustomDataStream: A variant specifying the store item which should be bound to, which can be any of the following:
A CustomDataStream object representing a desired stream
A String representing a root namespace of the desired stream—if there is more than one stream with that root namespace, grab the first item found in the store
An Integer representing the index of a desired store item in a store's collection XPath: A String representing an XPath to bind to. Attempt to ensure that it's valid XPath syntax and fail with an error message if it is not.

PrefixMapping: An optional String representing the prefix mappings that can be used when querying the provided XPath expression. If not present, use the set of prefix mappings used by the store item itself.

.XPath As String

A property which returns an object for locating an XPath expression used by a data binding 406 to point to a target XML node 416 within XML data 412.

It will be appreciated that code development using the above-listed properties, methods, and events can be tailored for a particular application.

It should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations making up the embodiments of the present invention described herein are referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method, comprising:
using a processor on a computing device, providing a presentation surface allowing a user to one of create and edit a document;
maintaining content of the document in extensible markup language (XML) data stored in an XML data store; wherein the XML data store is separate from the presentation surface and wherein the XML data store is populated with any XML data that is stored in the document after the document is opened;
providing content regions within the document, each content region including one or more data bindings configured to link the content region to at least one node of the xml data such that the content region presents the XML data that is stored by the at least one node that is linked by the one or more data bindings; wherein the one or more data bindings that are bound to structured XML data are movable within the document without affecting a structure of the data; wherein one or more of the one or more data bindings is a dangling reference that is not associated with XML data; wherein the dangling reference is resolved when the XML data is available within the XML data store;
allowing the user to modify one of a presentation and a position of the content region in the presentation surface without changing the XML data linked to the content region by the data binding;
allowing changes to be made to the XML data presented in the content region independently of changing the presentation surface by changing one of:
the XML data stored in one or more of the nodes associated within the XML data store; and
the data binding linking the content region to the XML data in another node with the content region; and
presenting the changes in the presentation surface.

2. The computer-implemented method of claim 1, wherein the presentation surface is configured for an application including one of:
word processing;
spreadsheet analysis;
database management;

presentation development; and drawing development.

3. The computer-implemented method of claim 1, wherein the content includes one or more of:

text;

numbers; and images.

4. The computer-implemented method of claim 1, wherein the data binding includes an XPath to specify the XML data associated with the data binding.

5. The computer-implemented method of claim 1, further comprising applying formatting code to change a format of the XML data to allow the XML data to be presented in the presentation surface in a presentation format different from a stored format of the XML data stored in the XML data store.

6. The computer-implemented method of claim 1, further comprising allowing the user to specify a property usable to locate a target node within the XML data store.

7. The computer-implemented method of claim 6, further comprising applying manipulating code to change the target node, including one of:

changing content of the target node; and deleting the target node from the XML data.

8. The computer-implemented method of claim 1, further comprising removing the data binding without changing the XML data linked by the data binding.

9. The computer-implemented method of claim 1, further comprising providing for the data binding to include a dangling reference wherein:

the data binding does not presently link the content region to at least one node within XML data stored in the XML data store; and the dangling reference is subsequently resolvable to link the content region to at least one node within the XML data stored in the XML data store.

10. The computer-implemented method of claim 1, further comprising, upon a change being made to the XML data, automatically causing the document linked to the XML data by the data binding to be changed to reflect the change made to the XML data.

11. The computer-implemented method of claim 1, further comprising specifying relationships between the presentation surface and the XML data applying limits on the availability of the XML data linked by the one or more data bindings to the at least one content region with for use in one or more other documents.

12. A computer-readable storage medium storing computer-instructions executable by a local computing system to generate a result, comprising:

using a processor on a computing device, presenting a word processor configured to allow a user to one of create and edit a document that follows at least one schema that provides a structure for the document comprising rules governing an order with which XML elements may be applied to content, the document including one or more content regions through a presentation surface, the presentation surface allowing the user to:

manipulate the one or more content regions to change at least one of appearance and content of the document without affecting the structure associated with the content of the document such that the XML elements used in the document follow the order specified by the at least one schema; and view the change to the document;

storing content presented in the one or more content regions in an extensible markup language (XML) data store maintained on the local computing system that is separate from the presentation surface; wherein the XML data store is populated with any XML data that is stored in the document after the document is opened; wherein the XML data is structured;

associating the content stored in the XML data store with respective content regions in which the content is presented using one or more data bindings specified by the user, wherein the data bindings are configured to allow for changing the document by changing one or more of:

the one or more content regions of the document to change the appearance of the document without changing the content stored in the XML data store;

the one or more content regions of the document to change a format of the content stored in the XML data store as presented in the document without changing a stored format of the content in the XML data store; and the content stored in the XML data without changing the one or more content regions of the document.

13. The computer-readable storage medium of claim 12, wherein the data binding includes an XPath to specify the XML data associated with the data binding.

14. The computer-readable storage medium of claim 12, further comprising allowing removing of the data binding without changing the XML data linked by the data binding.

15. The computer-readable storage medium of claim 12, further comprising providing for the data binding to include a dangling reference wherein the data binding does not presently link the content region to at least one node within XML data stored in the XML data store.

16. The computer-readable storage medium of claim 12, further comprising specifying relationships between the presentation surface and the XML data applying limits on the availability of the XML data for use in another document.

17. A system, comprising:

a processor;

a computer-readable storage medium;

an extensible markup language (XML) data store;

a word processor;

using the processor, presenting the word processor configured to allow a user to one of create and edit a document that follows at least one schema that provides a structure for the document comprising rules governing an order with which XML elements may be applied to content, the document including one or more content regions through a presentation surface, the presentation surface allowing the user to:

manipulate the one or more content regions to change at least one of appearance and content of the document without affecting the structure associated with the content of the document such that the XML elements used in the document follow the order specified by the at least one schema; and view the change to the document;

storing content presented in the one or more content regions in the extensible markup language (XML) data store maintained on a local computing system that is separate from the presentation surface; wherein the XML data store is populated with any XML data that is stored in the document after the document is opened; wherein the XML data is structured;

associating the content stored in the XML data store with respective content regions in which the content is presented using one or more data bindings specified by the user, wherein the data bindings are configured to allow for changing the document by changing one or more of:

the one or more content regions of the document to change the appearance of the document without changing the content stored in the XML data store;

the one or more content regions of the document to change a format of the content stored in the XML data store as presented in the document without changing a stored format of the content in the XML data store; and the content stored in the XML data without changing the one or more content regions of the document.

18. The system of claim 17, wherein the data binding includes an XPath to specify the XML data associated with the data binding.

19. The system of claim 17, further comprising allowing removing of the data binding without changing the XML data linked by the data binding.

20. The system of claim 17, further comprising providing for the data binding to include a dangling reference wherein the data binding does not presently link the content region to at least one node within XML data stored in the XML data store.

* * * * *